United States Patent
Tomizawa et al.

(10) Patent No.: US 9,034,988 B2
(45) Date of Patent: May 19, 2015

(54) RESIN COMPOSITION CONTAINING COPOLYMERIZED POLYESTER RESIN

(75) Inventors: Motoki Tomizawa, Okazaki (JP); Takao Okochi, Okazaki (JP); Tomoki Tanaka, Okazaki (JP); Naomi Kida, Okazaki (JP); Yuji Oida, Okazaki (JP)

(73) Assignees: UNITIKA LTD., Amagasaki-shi (JP); NIPPON ESTER CO., LTD., Okazaki-shi (JP)

( * ) Notice: Subject to any disclaimer, the term of this patent is extended or adjusted under 35 U.S.C. 154(b) by 0 days.

(21) Appl. No.: 13/813,904

(22) PCT Filed: Aug. 3, 2011

(86) PCT No.: PCT/JP2011/067739
§ 371 (c)(1),
(2), (4) Date: Jun. 11, 2013

(87) PCT Pub. No.: WO2012/018037
PCT Pub. Date: Feb. 9, 2012

(65) Prior Publication Data
US 2013/0274418 A1    Oct. 17, 2013

(30) Foreign Application Priority Data

| | | |
|---|---|---|
| Aug. 4, 2010 | (JP) | 2010-175405 |
| Oct. 6, 2010 | (JP) | 2010-226629 |
| May 24, 2011 | (JP) | 2011-115834 |
| Jun. 30, 2011 | (JP) | 2011-146028 |

(51) Int. Cl.
| | |
|---|---|
| *C08F 136/14* | (2006.01) |
| *C08G 63/181* | (2006.01) |
| *C08G 63/20* | (2006.01) |
| *C08G 63/52* | (2006.01) |
| *C08G 63/54* | (2006.01) |
| *C08G 63/692* | (2006.01) |

(52) U.S. Cl.
CPC .............. *C08F 136/14* (2013.01); *C08G 63/54* (2013.01); *C08G 63/6926* (2013.01)

(58) Field of Classification Search
CPC .... C08F 136/14; C08G 63/54; C08G 63/6926
USPC ......................................... 525/437, 439–445
See application file for complete search history.

(56) References Cited

U.S. PATENT DOCUMENTS 4,157,436 A * 6/1979 Endo et al. .................... 528/167

FOREIGN PATENT DOCUMENTS

| | | |
|---|---|---|
| JP | 02-003429 A | 1/1990 |
| JP | 10-110040 A | 4/1998 |
| JP | 2000-319369 A | 11/2000 |
| JP | 2003-176341 A | 6/2003 |
| JP | 2008-110369 A | 5/2008 |
| JP | 2010-077333 A | 4/2010 |

OTHER PUBLICATIONS

JPH10-1100740 Machine Translation.*
Croda Pripol 1010 technical data sheet.*
JPH10-110040 Machine Translation, JPH10-110040 publication date Apr. 1998.*
Croda Pripol 1010 technical data sheet, Jun. 2014.*

* cited by examiner

*Primary Examiner* — Randy Gulakowski
*Assistant Examiner* — Christopher M Rodd
(74) *Attorney, Agent, or Firm* — Fox Rothschild LLP

(57) ABSTRACT

A resin composition includes a copolymerized polyester resin, which exhibits excellent flexibility at room temperature, improvement in problems of brittleness, and excellent adhesiveness and moist-heat durability. The invention relates to a resin composition containing a copolymerized polyester resin which contains, as an acid component, an aromatic dicarboxylic acid and a dimer acid and, as a glycol component 1,4-butane diol and polybutadiene glycols, with the content of the dimer acid being 10 to 50 mol % in the acid component, the content of the 1,4-butane diol being 50 mol % or greater in the glycol component, and the content of the polybutadiene glycols being 0.5 to 20 mol % in the glycol component.

9 Claims, No Drawings

US 9,034,988 B2

RESIN COMPOSITION CONTAINING COPOLYMERIZED POLYESTER RESIN

TECHNICAL FIELD

The present invention relates to a resin composition containing a copolymerized polyester resin. Specifically, the present invention relates to a resin composition containing a copolymerized polyester resin that exhibits excellent flexibility, adhesiveness, moist-heat durability, or the like, with this copolymerized polyester resin containing, as an acid component, a dimer acid and, as a glycol component, 1,4-butane diol and polybutadiene glycols.

BACKGROUND ART

Polyester, in particular a copolymerized polyester containing as a main component, a polyethylene terephthalate (hereinafter, abbreviated as PET) unit or a polybutylene terephthalate (hereinafter, abbreviated as PBT) unit copolymerized with aliphatic dicarboxylic acid or various diols is known. The copolymerized polyester has excellent heat resistance, weather resistance, solvent resistance, flexibility, or the like, and thus is widely used for a film, a fiber, a sheet, various molded articles, and adhesives.

However, when the copolymerized polyester is used for an application in which high flexibility is required, it breaks easily as it has insufficient flexibility at low temperature or room temperature. For such reasons, there is a limit to the use of the copolymerized polyester.

To improve such disadvantages, a method of copolymerizing a polyester resin with a soft segment is suggested. A polyester-polyether block copolymer containing a polyether compound as a soft segment has low glass transition temperature and high fluidity as a resin, and the resin maintains the flexibility even when the molecular weight is lowered. For such reasons, it is widely used as a molding material that is used for electric and electronic components, automotive components, or the like. The polyester-polyether block copolymer is disclosed in Patent Document 1, for example.

However, the polyester-polyether block copolymer is prone to undergo hydrolysis due to the ester bond present in a hard segment. Further, the polyether compound as a soft segment is prone to undergo oxidative degradation, thermal degradation, or the like when exposed to high temperature, and thus the copolymer itself has a problem in wet heat durability or hot moisture resistance.

A polyester resin and a polyester resin composition suitable for molding are disclosed in Patent Document 2. The resin disclosed in Patent Document 2 is suitable for molding use for an electric and electronic component, and it is also described that the resin has excellent water resistance, durability, and fuel resistance.

However, with the composition disclosed in Patent Document 2, flexibility, wet heat durability, adhesiveness, or the like are not obtained at sufficient level. For such reasons, when used for a molding of an electric and electronic component, the product obtained from the resin has a problem that peeling occurs between the resin part and the electric and electronic component present inside or cracks occur at the resin part, and thus it is impossible to use it for a long period of time.

Patent Document 1: Japanese Patent Application Publication No. H2-3429
Patent Document 2: Japanese Patent Application Publication No. H2003-176341

DISCLOSURE OF THE INVENTION

Accordingly, a main object of the invention is to provide a polyester resin composition that exhibits excellent flexibility at room temperature, improvement in problems associated with brittleness, and also excellent adhesiveness and moist-heat durability. More specifically, a main object of the invention is to provide a resin composition containing a copolymerized polyester resin, which is suitable for hot-melt molding use, potting use, or the like of an electric and electronic component.

In consideration of the problems of conventional techniques, inventors of the present invention carried out intensive studies and as a result found that the aforementioned object can be achieved by using a specific copolymerized polyester resin, and completed invention accordingly.

Specifically, the invention relates to a resin composition containing the copolymerized polyester resin as described below.

1. A resin composition containing a copolymerized polyester resin which contains, as an acid component, an aromatic dicarboxylic acid and a dimer acid and, as a glycol component, 1,4-butane diol and polybutadiene glycols, with the content of the dimer acid being 10 to 50 mol % in the acid component, the content of the 1,4-butane diol being 50 mol % or greater in the glycol component, and the content of the polybutadiene glycols being 0.5 to 20 mol % in the glycol component.
2. The resin composition described in the above item 1, in which an organic phosphorus compound having two or more ester forming functional groups is copolymerized in the copolymerized polyester resin and content of phosphorus atoms in the resin is between 500 and 20000 ppm by mass.
3. The resin composition described in the above item 1, in which Young's modulus at 20° C. is 100 MPa or less.
4. The resin composition described in the above item 1, in which Shore D hardness at 20° C. is 50 or less.
5. The resin composition described in the above item 1, in which an oxygen index according to a combustion test is 27 or more.
6. A method for producing a resin molded article, this method including a step of molding the resin composition described in the above item 1 at a pressure of 5 MPa or less in order to obtain a resin molded article.
7. The method described in the above item 6, in which the step includes a step of injecting the resin composition described in the item 1 into a mold, in which industrial components are disposed in advance, in order to obtain a resin molded article having industrial components.
8. The method described in the above item 6, in which the step includes a step of injecting or adding dropwise the resin composition described in the above item 1 to a housing or a substrate, in which industrial components are disposed in advance. In order to obtain a resin molded article having industrial components.

Advantages of the Invention

The resin composition of the invention contains, as a main component, a copolymerized polyester resin which contains specific amounts of a dimer acid as an acid component and polybutadiene glycols as a glycol compound, and therefore it has excellent flexibility at room temperature, suitable hardness, less problems associated with brittleness, and also can exhibit excellent adhesiveness and excellent moist-heat durability.

For such reasons, the resin composition of the invention can be used not only for a film, a fiber, a sheet, and other various molded articles but also for adhesives.

Further, as the resin composition of the invention has excellent melt fluidity and can be molded by injection at low pressure, it is possible to provide a molded article having a thin part or a complex shape by melt molding.

Further, the resin composition of the invention can be also preferably used for a hot-melt molding for performing insert molding of a delicate electronic component or the like. Still further, the resin composition can be also preferably used for a potting use in which a component is disposed within a housing or on a substrate, a resin is molded thereon, and the housing or substrate is integrated with a component by using the resin composition.

In addition, as the resin composition of the invention has excellent moist-heat durability, the electric and electronic component obtained by insert molding of an electronic component can be used for a long period of time even under severe environmental conditions.

BEST MODE FOR CARRYING OUT THE INVENTION

1. Resin Composition Containing a Copolymerized Polyester Resin

Hereinafter, the resin composition containing a copolymerized polyester resin of the invention (that is, the resin composition of the invention) will be described in more detail. The copolymerized polyester resin as a main component of the resin composition of the invention (that is, copolymerized polyester resin of the invention) consists of, as a copolymerization component, an acid component including an aromatic dicarboxylic acid and a dimer acid and a glycol component including 1,4-butane diol and polybutadiene glycol.

(1) Copolymerized Polyester Resin
(1-1) Acid Component

First, explanations are given with regard to the acid component. Examples of the aromatic dicarboxylic acid which may be used include, in addition to terephthalic acid, isophthalic acid, 5-sodium sulfoisophthalate, phthalic anhydride, and naphthalene dicarboxylic acid, ester-forming derivatives of those acids. They may be used either singly or in combination of two or more. The aromatic dicarboxylic acid increases the melting point of the copolymerized polyester, thus contributing to providing heat resistance and also improving the mechanical strength. From this point of view, at least one of terephthalic acid and isophthalic acid is preferred as an aromatic dicarboxylic acid in the invention.

Content of the aromatic dicarboxylic acid in the acid component is, although not specifically limited, preferably between 50 and 90 mol %, and particularly preferably between 60 and 85 mol %. When the content of the aromatic dicarboxylic acid is less than 50 mol %, melting point of the copolymerized polyester is lowered, and thus not only the heat resistance is impaired but also mechanical strength is easily lowered. On the other hand, when it is more than 90 mol %, ratio of the dimer acid is decreased, and thus the copolymerized polyester resin may exhibit insufficient flexibility.

As used herein, the dimer acid indicates an unsaturated fatty acid obtained by thermal polymerization of an unsaturated fatty acid such as purified plant fatty acid obtained from drying oil, semidrying oil, or the like, or a saturated fatty acid obtained by partial or complete hydrogenation of the unsaturated fatty acid. The dimer acids contain dimer of an unsaturated fatty acid or a hydrogenated product thereof as a main component, but a trimer and a tetramer are also contained. Those well known in the field or commercially available products can be also used. Examples of the commercially available products that may be used include "Pripol" and "Priplast" (manufactured by Croda Inc.), "Empol" and "Sovermol" (manufactured by Cognis), and "UNIDYME" (manufactured by Arizona Chemical).

Content of the dimer acid in the acid component needs to be from 10 to 50 mol %. Particularly preferably, it is from 15 to 40 mol %. By containing the dimer acid as a copolymerization component, the copolymerized polyester resin to be obtained can have not only excellent flexibility but also improved moist-heat durability. When the content of the dimer acid in the acid component is less than 10 mol %, it is difficult to give flexibility to the copolymerized polyester resin to be obtained and moist-heat durability becomes insufficient. On the other hand, when the content of the dimer acid is higher than 50 mol %, the copolymerized polyester to be obtained has lower melting point or becomes non-crystalline, and thus heat resistance is lowered and also mechanical strength is also easily impaired.

In the copolymerized polyester resin of the invention, the aromatic dicarboxylic acid and dimer acid as described above are included as the acid component. However, as long as the profitable effect of the invention is not negatively affected, components other than those can be included as a copolymerization component. Examples of other component include succinic acid, adipic acid, azelaic acid, sebacic acid, dodecane dioic acid, and eicosane dioic acid.

(1-2) Glycol Component

The copolymerized polyester resin of the invention contains 1,4-butane diol as a glycol component. Content of 1,4-butane diol in the glycol component needs to be 50 mol. % or more. Particularly preferably, it is from 60 to 98 mol %. Most preferably, it is from 80 to 98 mol %. By containing 1,4-butane diol in an amount of 50 mol % or more as a glycol component, the copolymerized polyester resin to be obtained can exhibit higher melting point, and thus the heat resistance is increased and also the molding property is improved. When used for molding, in particular, it is preferably contained in an amount of from 80 to 98 mol %. When a dial other than 1,4-butane diol is used, it is difficult to obtain the desired properties. For example, when 1,2-ethylene glycol is used instead of 1,4-butane diol, the copolymerized polyester resin to be obtained has slow crystallization rate, yielding poor molding property. Further, when 1,6-hexane diol is used instead of 1,4-butane diol, the copolymerized polyester to be obtained has low melting point, yielding poor heat resistance.

Further, in the glycol component of the copolymerized polyester resin of the invention, polybutadiene glycols are included. Content of the polybutadiene glycols in the glycol component needs to be from 0.5 to 20 mol %. Particularly preferably, it is from 2 to 18 mol %. Most preferably, it is from 3 to 16 mol %.

By containing the polybutadiene glycols in the glycol component, the copolymerized polyester resin to be obtained can exhibit excellent flexibility and excellent moist-heat durability. When the ratio of the polybutadiene glycols is less than 0.5 mol %, it is difficult to obtain copolymerized polyester resin having excellent flexibility and excellent moist-heat durability. On the other hand, when the ratio of the polybutadiene glycols is greater than 20 mol %, the copolymerized polyester to be obtained has lower melting point, and thus heat resistance is lowered and also mechanical strength is also easily impaired.

The polybutadiene glycols preferably have an average molecular weight of from 350 to 6000. More preferably, it is from 500 to 4500. When the average molecular weight of the polybutadiene glycols is higher than 6000, compatibility is impaired, and thus it is difficult to perform copolymerization. On the other hand, when the molecular weight is lower than 350, it may be difficult to improve the flexibility of the copolymerized polyester resin to be obtained.

As for the polybutadiene glycols, in addition to 1,2-polybutadiene glycol and 1,4-polybutadiene glycol, hydrogenated polybutadiene glycols obtained by reducing these compounds with hydrogen can be also used. More specifically, diols obtained by polymerizing butadiene by anion polymerization and introducing a hydroxy group or a group having a hydroxy group to both ends of the obtained polymer by end treatment, or diols obtained by reducing double bonds with hydrogen (that is, hydrogenated polybutadiene glycols), or the like can be employed.

As for the polybutadiene glycols, those well known in the field or commercially available products can be used. Specific examples include hydroxylated polybutadiene mainly consisting of 1,4-repeating unit (for example, "Poly bd R-45HT" and "Poly bd R-15HT" manufactured by Idemitsu Kosan Co., Ltd.), hydroxylated polybutadiene mainly consisting of 1,2-repeating unit (for example, "G-1000", "G-2000", and "G-3000" manufactured by Nippon Soda Co., Ltd.), and hydroxylated and hydrogenated polybutadiene (for example, "GI-1000", "GI-2000", and "GI-3000" manufactured by Nippon Soda Co., Ltd.).

According to the invention, hydrogenated polybutadiene glycol is preferred as the polybutadiene glycols. Since it is unlikely for the hydrogenated polybutadiene glycol to undergo a side reaction during polycondensation reaction, it is possible to obtain the copolymerized polyester resin with excellent flexibility, moist-heat durability, or the like.

In the copolymerized polyester resin of the invention, components other than 1,4-butane diol and polybutadiene glycols may be contained as a glycol component (that is, copolymerization component) within the range in which the profitable effect of the invention is not negatively affected. Examples of such component include at least one of ethylene glycol, propylene glycol, 1,3-propane diol, 1,5-pentane diol, 1,6-hexane diol, neopentyl glycol, ethylene oxide adduct and propylene oxide adduct of bisphenol A, polyethylene glycol, polypropylene glycol, and polytetramethylene glycol or the like.

(1-3) Component for Flame Retardation

In order to give a flame retardation property to the copolymerized polyester resin of the invention, an organo phosphorus compound having two or more ester forming functional groups is copolymerized as a flame retardation component and content of phosphorus atoms is preferably from 500 to 20000 ppm by mass in the copolymerized polyester resin.

According to the invention, examples of the ester forming functional group include a carboxyl group and a hydroxyl group. When the organo phosphorus compound contains no ester forming functional group, it is not copolymerized to polyester chain, and as a result, scattering may occur during polycondensation and flame retardancy may not be exhibited at sufficient level. When there is only one ester forming functional group, the polycondensation reaction is inhibited and the polymerization degree is not increased, and therefore undesirable. For such reasons, two or more the ester forming functional groups are necessary, and among them, those having 2 to 3 functional groups are preferable.

Content of phosphorus atoms in the copolymerized polyester resin is from 500 to 20000 ppm by mass, and it is preferably from 2000 to 18000 ppm by mass in particular. When the content of phosphorus atoms is less than 500 ppm by mass, the flame retardancy of the copolymerized polyester resin becomes insufficient, making it difficult to use it for an application in which high flame retardancy is required. On the other hand, when it is higher than 20000 ppm by mass, the copolymerized polyester may have lower melting point or becomes non-crystalline, and thus heat resistance is lowered.

Preferred examples of the organic phosphorus compound having two or more ester forming functional groups include the compounds represented by the following formula (I), from the viewpoint of reactivity of polycondensation, remaining ratio of the organic phosphorus compound, or the like.

[C1]

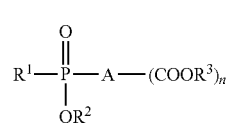

(1)

With the proviso that, $R^1$ represents an alkyl group or an aryl group having 1 to 12 carbon atoms, $R^2$ represents an alkyl group, an aryl group, a monohydroxyalkyl group having 1 to 18 carbon atoms, a cycle with $R^1$, or a hydrogen atom, $R^3$ represents an alkyl group, an aryl group, a monohydroxyalkyl group having 1 to 18 carbon, or a hydrogen atom, and A represents a hydrocarbon group with valency of two or higher. Further, n represents the number which is obtained by subtracting 1 from the valency of A.

Specific examples of the preferred organic phosphorus compound represented by the formula (I) include the following structural formulae (a) to (d).

[C 2]

(a)

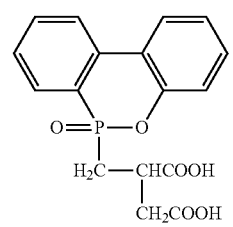

(b)

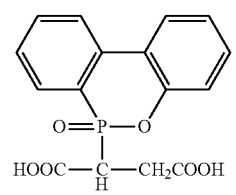

(c)

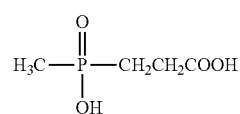

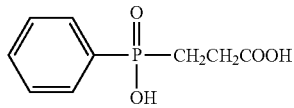

(2) Resin Composition Based on the Copolymerized Polyester (2-1) Composition of the Resin Composition The resin composition of the invention contains the copolymerized polyester resin described above. Content of the copolymerized polyester resin is, although it may be suitably set depending on type, pre-determined use, or the like of the copolymerized polyester resin, generally from 30 to 100% by mass, preferably from 50 to 100% by mass, and more preferably from 70 to 100% by mass in the resin composition. The resin composition of the invention includes a case in which other components are included in addition to the copolymerized polyester resin as well as a case in which the copolymerized polyester resin is 100% by mass. When content of the copolymerized polyester resin is less than 100% by mass, additives, resin components, or the like may be added as described below.

Examples of the additives include additives well known in the field like a pigment, a heat stabilizer, an anti-oxidant, an anti-weathering agent, a flame retardant agent, a plasticizer, a lubricating agent, a releasing agent, an anti-static agent, a filling agent, and a crystal nucleating agent. By using the additives, a resin composition containing the copolymerized polyester resin of the invention can be prepared.

As described above, it is preferable that a specific organic phosphorus compound is copolymerized in the copolymerized polyester resin of the invention to have flame retardancy. However, to give flame retardancy to the resin composition of the invention, it is also possible to contain flame retardant agents as described below. Examples of the flame retardant agents include a phosphorus-based flame retardant agent, a hydrated metal compound (for example, aluminum hydroxide and magnesium hydroxide), a nitrogen-containing compound (for example, a melamine-based and a guanidine-based compound), and an inorganic compound (for example, borates and Mo compounds). Among them, at least one of aromatic condensed phosphate ester compounds, brominated aromatic compounds, and antimony oxide compounds are preferable. When brominated aromatic compounds or antimony oxide compounds are used, it is preferable to use them in combination. Preferred examples of the brominated aromatic compounds include a brominated epoxy resin. Preferred examples of the antimony oxide compounds include antimony trioxide ($Sb_2O_3$). Further, content of the flame retardant agent is preferably from 2 to 30 parts by mass per 100 parts by mass of the copolymerized polyester resin.

Further, having measures for dealing with heat, for example, efficiently releasing the heat generated from various electronic components to an external environment, also remains as a main problem, and to solve the problem, it is preferable that the copolymerized polyester resin of the invention is given with heat conductivity. Specifically, it is preferable that a heat conductive filling agent is added to the copolymerized polyester resin of the invention.

Examples of the heat conductive filling agent include flake-like graphite, flake-like boron nitride having hexagonal crystal structure, aluminum oxide, magnesium carbonate, zinc oxide, and talc. Further, content of the filling agent is, although not specifically limited, preferably from 50 to 150 parts by volume, and more preferably from 60 to 120 parts by volume per 100 parts by volume of the copolymerized polyester resin.

Examples of the heat stabilizer or anti-oxidant include hindered phenols, phosphorus compounds, hindered amines, sulfur compounds, copper compounds, and halides of an alkali metal.

Further, a method for adding the additives described above to the resin composition of the invention is not specifically limited.

Further, within the range in which the advantages of the invention is not negatively affected, the resin composition of the invention may contain resin components other than the copolymerized polyester resin of the invention. For example, a resin like polyethylene, polypropylene, polybutadiene, polystyrene, an AS resin, an ABS resin, poly(acrylic acid), poly(acrylic acid ester), poly(methacrylic acid), poly(methacrylic acid ester), polyethylene terephthalate, polyethylene naphthalate, polycarbonate, and a copolymer thereof may be added and used.

(2-2) Use and Characteristics of the Resin Composition

The resin composition of the invention can be applied for the same molding method as those used for a known resin composition. In particular, it may be preferably used for an injection molding at relatively low pressure. Specifically, it is most suitable for molding at pressure of 0.1 to 5 MPa, in particular 0.1 to 3 MPa. For such case, the temperature (that is, temperature for melting) is, although may vary depending on types of a resin composition, generally in the range of 180 and 240° C. Thus, the resin composition of the invention is suitable for a hot-melt molding method or a potting method.

The hot-melt molding method as described in the invention indicates a method by which a resin composition is melt without using a solvent, the melt resin composition is subjected to injection molding at low pressure (preferably, 0.1 to 3 MPa) into a mold disposed in advance with an industrial component (particular, electronic component) (hereinafter, also referred to as a "component"), and the resin composition is molded as a housing or a case of the component (so-called insert molding). Thus, the invention encompasses a method of producing a resin molded article comprising a step of obtaining a resin molded article having industrial components by injecting the resin composition of the invention into a mold disposed in advance with an industrial component.

As used herein, the potting method indicates a method of integrating a housing or a substrate with a component by placing in advance a component in a housing or a substrate and injecting or adding dropwise the melt resin composition at low pressure (1 MPa or less). Thus, the invention includes a method of producing a resin molded article including a step of obtaining a resin molded article having industrial components by injecting or adding dropwise the resin composition of the invention into a housing or a substrate disposed in advance with an industrial component.

As the resin composition of the invention is excellent in flexibility, adhesiveness, moist-heat durability, or the like, when used for hot-melt molding or potting, a favorable molding processability is exhibited. In addition, a product (component) to be obtained has excellent adhesion between an electronic component to be inserted and the resin. Further, the copolymerized polyester resin of the invention is excellent in flexibility, moist-heat durability, or the like. For such reasons, peeling between the resin and electronic component is unlikely to occur. In particular, even when used under a severe environmental condition for a long period of time, peeling between the resin and electronic component does not occur, and thus it is unlikely to have fissures or cracks in the resin part.

Further, as described above, when the resin composition of the invention is given with flame retardancy by a specific organic phosphorus compound or other flame retardant agent, the composition can be desirably used for applications in which flame retardancy is required.

The resin composition (molded article produced with the resin composition) of the invention comprises, as described above, the copolymerized polyester resin which contains a dimer acid as an acid component and a polybutadiene glycol as a glycol component in a specific amount, and therefore has excellent flexibility. As an index for indicating the flexibility, Young's modulus at 20° C. is preferably 100 MPa or less, and more preferably it is 60 MPa or less.

Young's modulus is measured as follows: the resin composition of the invention is subjected to melting at the temperature which is 50° C. higher than the melting point, the molten resin is then injection-molded at the pressure of 1 MPa by using the injection molding apparatus "PS20E2ASE" manufactured by NISSEI PLASTIC INDUSTRIAL CO., LTD. to give a molding sample having the thickness of 1 mm and width of 3 mm, and the sample is measured at the elongation rate of 10 mm/min at 20° C. by using a tensile tester "TENSILON" (UTM-4-100, manufactured by ORIENTEC Co., LTD.).

As the resin composition (molded article produced with the resin composition) of the invention has the composition described above, it has suitable hardness and improved brittleness as well as excellent flexibility. As an index for exhibiting suitable hardness and improved brittleness, Shore D hardness at 20° C. is preferably 50 or less, and more preferably 45 or less.

The Shore D hardness is measured as follows: the resin composition of the invention is subjected to melting at the temperature which is 50° C. higher than the melting point, the molten resin is then injection-molded at the pressure of 1 MPa by using the injection molding apparatus "PS20E2ASE" manufactured by NISSEI PLASTIC INDUSTRIAL CO., LTD. to give a molding sample with the thickness of 3 mm and width of 20 mm, and the two samples are overlapped and measured at 20° C. by using Shore D hardness meter (WESTOP WR-105D). Further, the measurement using Shore D hardness meter is performed to read peak values within one second under load pressure of 50 N, and average value of ten measurements is calculated.

When Young's modulus at 20° C. is higher than 100 MPa, the resin composition of the invention may have insufficient flexibility. On the other hand, when Shore D hardness at 20° C. is higher than 50, the resin composition of the invention has insufficient hardness, and as a result, it becomes brittle and may be difficult to be used for various applications.

The resin composition (molded article composed of the resin composition) containing the copolymerized polyester resin of the invention has excellent flexibility, suitable hardness, and improved brittleness, and both the Young's modulus at 20° C. and Shore D hardness at 20° C. are preferably within the ranges described above.

Further, by having the composition described above, the resin composition of the invention has excellent moist-heat durability. As an index for exhibiting the moist-heat durability, those having tensile strain retention rate of 80% or more are preferable, those having tensile strain retention rate of 85% or more are more preferable, and those having tensile strain retention rate of 90% or more are still more preferable. When the tensile strain retention rate is lower than 80%, the resin may have a significant strength decrease according to a moist heat treatment, and the molded article using the resin composition may have poor shape stability, that is, poor moist-heat durability.

Further, as used herein, the tensile strain retention rate is calculated as follows: the resin composition of the invention is subjected to melting at the temperature which is 50° C. higher than the melting point, the molten resin is then injection-molded at the pressure of 1 MPa by using the injection molding apparatus "PS20E2ASE" manufactured by NISSEI PLASTIC INDUSTRIAL CO., LTD. to give a molding sample with the thickness of 1 mm and width of 3 mm, and tensile strain at break is measured according to the method described by ISO standard 527-2 (that is, tensile strain at break before treatment). Then, using a constant temperature and humidity incubator (IG400 manufactured by Yamato Scientific Co., Ltd.), the obtained molded sample is stored for 200 hours under an environment including temperature of 60° C. and humidity of 95% RH, and the moist heat treatment is carried out. The tensile strain at break of the sample obtained after the moist heat treatment is measured in the same manner as above, and calculation is made based on the following equation.

Tensile strain retention rate(%)=[(Tensile strain at break after treatment)/(Tensile strain at break before treatment)]×100

When the resin composition of the invention is given with flame retardancy by a specific organic phosphorus compound or other flame retardant agents, the resin composition of the invention has, as an index for exhibiting flame retardancy, oxygen index (hereinafter, abbreviated as OI) of preferably 27 or more, and more preferably 28 or more according to the combustion test described in JIS K7201. When the OI value is lower than 27, the flame retardancy is insufficient and not suitable for electric and electronic components, and therefore undesirable.

The resin composition of the invention also has excellent heat resistance. Specifically, a melting point of the copolymerized polyester resin and the resin composition of the invention is preferably from 115 to 180° C., and more preferably from 130 to 170° C. When the melting point is lower than 115° C., heat resistance is insufficient, and therefore applications for use may be limited. On the other hand, when it is higher than 180° C., high processing temperature is required for molding, and thus it is disadvantageous in terms of cost and also deterioration of the resin caused by heat may become significant.

Meanwhile, the melting point is measured by using diamond DSC manufactured by Perkin Elmer Co., Ltd., increasing and decreasing the temperature at the rate of 10° C./min, and measuring the temperature of melting peak.

The resin composition of the invention also has excellent adhesiveness, and exhibits excellent adhesion to various resins and metals which constitute electric and electronic components. Among these, it exhibits excellent adhesion to PET, PBT, or polyphenylene sulfide.

The resin composition of the invention preferably has melt viscosity of from 1 to 300 Pa·s, and more preferably of from 3 to 150 Pa·s at 200° C. When the melt viscosity is within the range, molding processing can be made at low temperature, and thus the composition becomes suitable for applications such as hot-melt molding or potting. When the melt viscosity is higher than 300 Pa·s, the fluidity is decreased, and thus molding at low pressure may be difficult to perform. Further, when the temperature for melting is increased to lower the melt viscosity, not only the load to the device is increased but also degradation of the copolymerized polyester resin caused by heat is significantly increased. Meanwhile, when the melt viscosity is lower than 1 Pa·s, it is easier for the copolymerized polyester resin composition (resin molded article) to have lower strength.

The melt viscosity is measured at shear rate of 1000 sec$^{-1}$ by using a flow tester (CFT-500, manufactured by Shimadzu Corporation) and a nozzle with nozzle diameter of 1.0 mm and nozzle length of 10 mm.

2. Method for Preparing the Resin Composition Containing the Copolymerized Polyester Resin First, the method for preparing the copolymerized polyester resin of the invention will be explained. The method for preparing the copolymerized polyester resin is not specifically limited as long as copolymerization can be made by using each component described above. Thus, except that each component described above is used at pre-determined ratio, the same condition as the condition for preparing known copolymerized polyester resin can be also used.

As for the method for preparing the copolymerized polyester resin of the invention, for example, the acid component and glycol component are subjected to an esterification reaction at a temperature of from 150 to 250° C. followed by polycondensation at from 230 to 300° C. while reducing the pressure (preferably, reducing the pressure from the atmospheric pressure to the pressure of approximately from 10 to 30 Pa) in the presence of a catalyst for polycondensation reaction to give the copolymerized polyester resin of the invention. Further, for example, derivatives such as dimethyl ester of aromatic dicarboxylic acid ester and glycol component are subjected to an ester exchange reaction at a temperature of from 150 to 250° C. followed by polycondensation at from 230 to 300° C. while reducing the pressure (preferably, reducing the pressure from the atmospheric pressure to the pressure of approximately from 10 to 30 Pa) in the presence of a catalyst for polycondensation reaction to give the copolymerized polyester resin of the invention.

Further, in case of copolymerization of the organo phosphorus compound, the method is performed by adding an organo phosphorus compound having two or more ester forming functional, groups in addition to the aforementioned acid component and diol component, carrying out an esterification reaction or an ester exchange reaction under the same condition as above, and carrying out polycondensation, the copolymerized polyester resin of the invention in which the organo phosphorus compound is copolymerized can be obtained.

To the copolymerized polyester resin obtained from above, by homogeneously mixing additives and other resin components (hereinafter, referred to as "additives or the like"), if necessary, a resin composition can be also obtained. As for the method for adding additives and other components or the like (hereinafter, referred to as "additives or the like") to the copolymerized polyester, any method as follows can be used, for example; 1) batch blending method which includes adding simultaneously the copolymerized polyester resin and the additives or the like using a screw type extruder and pelleting them by melting and kneading, and 2) divided blending method which includes melting and kneading the copolymerized polyester resin, supplying the additives or the like via other inlet of an extruder, and pelleting them by melting and kneading.

The resin composition of the invention is suitable for a hot-melt molding and a potting method. However, in a similar manner to a known polyester resin composition, it may be used in various forms. For example, in addition to the use as various molded articles like a film, a fiber, and a sheet, it may be also used as adhesives. In particular, for obtaining a film, a fiber, or the like, it may be produced by using a known method, apparatus, or the like. Further, for obtaining a sheet or a molded article, it may be molded by a known molding method like injection molding, blow molding, and extrusion molding. Additionally, for use as adhesives, when it is molded into a shape like sheet, for example, followed by heat treatment, it becomes possible to be used as adhesives.

EXAMPLES

Hereinafter, characteristics of the invention are explained in greater detailed in view of the Examples and the Comparative Examples. However, the scope of the invention is not limited to the Examples.

Methods for measurement and evaluation of various characteristic values in the Examples are as follows.

(1) Melting Point and Melt Viscosity

Measurement was made in the same manner as described above.

(2) Composition of Polymer

The obtained copolymerized polyester resin was dissolved in a mixture solvent containing deuterated hexafluoroisopropanol and deuterated chloroform (volume ratio=1:20) and then subjected to the 1H-NMR measurement by using LA-400 type NMR apparatus manufactured by JEOL Ltd. Consequently, determination was made based on the integrated strength of peaks in the resulting chart that are derived from the protons of each copolymerization component composed of the copolymerized polyester resin.

(3) Content of Phosphorus Atoms in the Copolymerized Polyester Resin

Measurement was made by using fluorescent X ray spectrometer 3270 manufactured by Rigaku Corporation.

(4) Shore D Hardness and Young's Modulus

Measurement was made in the same manner as described above.

(5) Tensile Strain at Break and Tensile Strain Retention Rate (Moist-Heat Durability)

Measurement was made in the same manner as described above.

(6) Tensile Strength

The same molding sample as those obtained for measurement of section (5) was used, and the measurement was made at the elongation rate of 10 mm/min at 20° C. by using a tensile tester "TENSILON" (UTM-4-100, manufactured by ORIENTEC Co., LTD.).

(7) Adhesiveness

The obtained copolymerized polyester resin (or, resin composition) was formed into a sheet having a thickness of 50 μm, and then the sheet was inserted between polyphenylene sulfide sheets having a thickness of 100 μm, followed by heat treatment for 30 sec at a pressure of 0.2 MPa and the temperature which is 50° C. higher than the melting point to prepare a sample having a width of 15 mm and length of 100 mm. The sample was then subjected to peeling at peeling rate of 50 mm/min according to JIS K-6854 by using a tensile tester "TENSILON" (UTM-4-100, manufactured by ORIENTEC Co., LTD.). The adhesiveness was evaluated according to the following three criteria.

◯ . . . peel strength is 10 N/15 mm or higher
Δ . . . peel strength is lower than 10 N/15 mm, but equal to or higher than 5 N/15 mm
x . . . peel strength is lower than 5 N/15 mm (8) Molding Property 1 (Hot-Melt Molding)

The obtained copolymerized polyester resin (or, resin composition) was melt at the temperature which is 50° C. higher than the melting point and then subjected to injection molding at a pressure of 1 MPa by using "PS20E2ASE" manufactured by NISSEI PLASTIC INDUSTRIAL CO., LTD. At that time, as a material to be molded, a circuit board which has been produced by soldering two lead wires made of polyvinyl chloride was used. By performing insert molding using an aluminum-made mold, an electric component in which the copolymerized polyester resin (or, resin composition) and the circuit board are integrated is obtained.

Based on the time until the release can be made from a mold (that is, releasing time), molding property for obtaining the component was evaluated according to the following three criteria.

○ . . . releasing time was 10 sec or less.
Δ . . . releasing time was longer than 10 sec but 20 sec or less.
× . . . releasing time was longer than 20 sec.

The component which has been found to have molding property "○" was kept for 500 hours under an environment of 80° C., 95% (that is, moist heat treatment). With respect to both of the component at which the component is obtained (that is, before the treatment) and the component after the treatment, insulating properties of the circuit board were evaluated as follows.

○ . . . insulating properties were maintained.
× . . . insulating properties were disrupted.

Further, the spots at which two lead wires are soldered together (that is, two spots) were not connected to each other in the circuit board. Thus, in general condition, there is no electricity between two lead wires (that is, insulating properties are maintained). However, once water is introduced between the resin and circuit board after moist heat treatment, water functions as a conductor and allows electric current between two lead wires (that is, insulating properties are disrupted).

(9) Molding Property 2 (Potting)

The obtained copolymerized polyester resin (or, resin composition) was melt at the temperature which is 50° C. higher than the melting point. After that, to a circuit board disposed in a housing (vessel type), which is the same as the one used for Molding property 1, the molten copolymerized polyester resin (or, resin composition) was injected at a pressure of 0.5 MPa followed by integration of the housing, resin, and circuit board to give an electric component.

Molding property for obtaining the component was visually evaluated according to the following three criteria.

○ . . . The resin flowed into the entire component and no irregularities are observed on the surface.
Δ . . . The resin flowed into the entire component but irregularities in shape are observed.
× . . . The resin flow was insufficient and part of the circuit board was exposed.

The component which has been found to have molding property "○" was kept for 500 hours under an environment of 80° C., 95% (that is, moist heat treatment). With respect to both of the component at which the component is obtained (that is, before the treatment) and the component after the treatment, insulating properties of the circuit board were evaluated as follows.

○ . . . insulating properties were maintained.
× . . . insulating properties were disrupted.

Further, the spots at which two lead wires are soldered together (that is, two spots) were not connected to each other in the circuit board. Thus, in general condition, there is no electricity between two lead wires (that is, insulating properties are maintained). However, once water is introduced between the resin and circuit board after moist heat treatment, water functions as a conductor and allows electric current between two lead wires to be flowed (that is, insulating properties are disrupted).

(10) Oxygen index (OI)

Combustion test described in JIS K7201 was performed to obtain OI. Those having an index value of 27 or higher were taken as "pass."

(11) Thermal Conductivity

After obtaining the thermal diffusivity α, density ρ, and specific heat Cp, the thermal conductivity λ was calculated as their multiplied value according to the following equation.

$$\lambda = \alpha \rho Cp$$

λ: thermal conductivity (W/(m·K))
α: thermal diffusivity rate (m²/sec)
ρ: density (g/m³)
Cp: specific heat (J/(g·K))

The thermal diffusivity α was measured as follows: the obtained resin composition based on the copolymerized polyester resin is molded into a disc having a diameter of 30 mm using an injection molding device, and then a sample is obtained by cutting the disc so as to have a pre-determined size. The thermal diffusivity α of the sample is measured by laser flash method by using a laser flash thermal constant analyzer TC-7000 (manufactured by ULVAC-RIKO, Inc.). The density ρ was measured by using an electronic densimeter ED-120T (Miraju Boeki). The specific heat Cp was measured by using the differential scanning calorimeter DSC-7 (manufactured by Perkin Elmer Co., Ltd.) at the condition including a temperature increase rate of 10° C./min.

Example 1-1

As an acid component, 60 parts by mass of terephthalic acid, 9 parts by mass of isophthalic acid, and 60 parts by mass of hydrogenated dimer acid having 36 carbon atoms (Pripol 1009 manufactured by Croda Japan K.K.), and as a diol component, 58 parts by mass of 1,4-butane diol and 78 parts by mass of polybutadiene glycol (hydroxylated and hydrogenated polybutadiene mainly having 1,2-repeating unit; "GI-1000" manufactured by Nippon Soda Co., Ltd.) were used for carrying out an esterification reaction by heating at 240° C. Next, 0.1 parts by mass of tetra-n-butyl titanate were added as a catalyst and high vacuum of between 10 and 30 Pa was achieved by gradually increasing the vacuum level for 60 min at a temperature of 240° C. Thereafter, the polycondensation reaction was performed for 4 hours to give the copolymerized polyester resin having the composition indicated in Table 1.

Examples 1-2 to 1-8 and Comparative Examples 1-1 to 2 and 1-4 to 1-6

The copolymerized polyester resin was obtained in the same manner as Example 1-1 except that type and addition amount of terephthalic acid, isophthalic acid, hydrogenated dimer acid, 1,4-butane dial, and polybutadiene glycol are modified and the composition (content) is adjusted to those indicated in Table 1. Further, in Example 1-7, "GI-2000" (hydroxylated and hydrogenated polybutadiene mainly having 1,2-repeating unit, manufactured by Nippon Soda Co., Ltd.) was used as a polybutadiene glycol. Further, in Example 1-8, dimer acid having 36 carbon atoms (Pripol 1013 manufactured by Croda Japan K.K.) was used as a dimer acid.

Example 1-9

The copolymerized polyester resin was obtained in the same manner as Example 1-1 except that 1,4-butane diol and 1,6-hexane diol are used as a glycol component and the composition (content) is adjusted to those indicated in the Table 1.

Comparative Example 1-3

The copolymerized polyester resin was obtained in the same manner as Example 1-1 except that only 1,6-hexane diol is used as a glycol component and the composition (content) is adjusted to those shown in Table 1.

Composition, characteristic values, and evaluation results of the copolymerized polyester resin obtained from Examples 1-1 to 1-9 and Comparative Examples 1-1 to 1-6 are given in Table 1.

TABLE 1

| | Composition (mol %) | | | | | | | | Melting point °C. | Melt viscosity Pa·s | Young's modulus MPa | Shore D hardness | Tensile strength MPa |
|---|---|---|---|---|---|---|---|---|---|---|---|---|---|
| | Acid component | | | | Glycol component | | | | | | | | |
| | TPA | IPA | DA | Hydrogenated DA | BD | HD | PB1000 | PB2000 | | | | | |
| Ex. 1-1 | 70 | 10 | | 20 | 90 | | 10 | | 150 | 50 | 20 | 29 | 9 |
| Ex. 1-2 | 70 | 10 | | 20 | 95 | | 5 | | 156 | 60 | 40 | 35 | 11 |
| Ex. 1-3 | 70 | | | 30 | 90 | | 10 | | 155 | 50 | 10 | 25 | 8 |
| Ex. 1-4 | 70 | | | 30 | 95 | | 5 | | 170 | 70 | 30 | 33 | 9 |
| Ex. 1-5 | 75 | 10 | | 15 | 90 | | 10 | | 150 | 40 | 55 | 40 | 12 |
| Ex. 1-6 | 75 | | | 25 | 85 | | 15 | | 142 | 50 | 30 | 35 | 8 |
| Ex. 1-7 | 70 | 10 | | 20 | 90 | | | 10 | 150 | 50 | 20 | 29 | 8 |
| Ex. 1-8 | 70 | 10 | 20 | | 90 | | 10 | | 149 | 50 | 20 | 30 | 9 |
| Ex. 1-9 | 70 | 10 | | 20 | 75 | 20 | 5 | | 118 | 50 | 20 | 30 | 11 |
| Com. Ex. 1-1 | 85 | 10 | | 5 | 90 | | 10 | | 196 | Not dissolved | 130 | 56 | 19 |
| Com. Ex. 1-2 | 45 | | | 55 | 90 | | 10 | | Impossible to measure | 40 | 5 | 20 | 3 |
| Com. Ex. 1-3 | 70 | 10 | | 20 | | 90 | 10 | | 86 | 50 | 20 | 29 | 12 |
| Com. Ex. 1-4 | 70 | | | 30 | 100 | | 0 | | 158 | 60 | 105 | 54 | 14 |
| Com. Ex. 1-5 | 70 | 10 | | 20 | 99.7 | | 0.3 | | 155 | 60 | 110 | 52 | 13 |
| Com. Ex. 1-6 | 70 | 10 | | 20 | 75 | | 25 | | 118 | 50 | 10 | 30 | 4 |

| | Moist-heat durability | | | | Molding property 1 | | | Molding property 2 | | |
|---|---|---|---|---|---|---|---|---|---|---|
| | Tensile strain at break before treatment | Tensile strain at break after treatment % | Tensile strain retention rate % | Adhesiveness | Molding property | Insulating properties before treatment | Insulating properties after treatment | Molding property | Insulating properties before treatment | Insulating properties after treatment |
| Ex. 1-1 | 820 | 750 | 91 | ○ | ○ | ○ | ○ | ○ | ○ | ○ |
| Ex. 1-2 | 760 | 730 | 96 | ○ | ○ | ○ | ○ | ○ | ○ | ○ |
| Ex. 1-3 | 870 | 830 | 95 | ○ | ○ | ○ | ○ | ○ | ○ | ○ |
| Ex. 1-4 | 840 | 790 | 94 | ○ | ○ | ○ | ○ | ○ | ○ | ○ |
| Ex. 1-5 | 800 | 770 | 96 | ○ | ○ | ○ | ○ | ○ | ○ | ○ |
| Ex. 1-6 | 810 | 780 | 96 | ○ | ○ | ○ | ○ | ○ | ○ | ○ |
| Ex. 1-7 | 830 | 760 | 92 | ○ | ○ | ○ | ○ | ○ | ○ | ○ |
| Ex. 1-8 | 790 | 750 | 95 | ○ | ○ | ○ | ○ | ○ | ○ | ○ |
| Ex. 1-9 | 770 | 710 | 92 | ○ | Δ | | | Δ | | |
| Com. Ex. 1-1 | 680 | 478 | 70 | X | ○ | ○ | X | ○ | ○ | X |
| Com. Ex. 1-2 | 890 | 855 | 96 | ○ | X | | | X | | |
| Com. Ex. 1-3 | 740 | 590 | 80 | ○ | X | | | X | | |
| Com. Ex. 1-4 | 720 | 550 | 76 | X | ○ | ○ | X | ○ | ○ | X |
| Com. Ex. 1-5 | 700 | 520 | 74 | X | ○ | ○ | X | ○ | ○ | X |
| Com. Ex. 1-6 | 830 | 780 | 94 | ○ | Δ | | | Δ | | |

TPA: terephthalic acid
IPA: isophthalic acid
DA: dimer acid
Hydrogenated DA: hydrogenated dimer acid
BD: 1,4-butane diol
HD: 1,6-hexane diol
PB: 1,2-polybutadiene glycol As clearly indicated in Table 1, the copolymerized polyester resins obtained from Examples 1-1 to 1-9 have a composition which satisfies the conditions of the invention, and therefore Young's modulus at 20° C. was 55 MPa or less, Shore D hardness at 20° C. was 45 or less, and they have excellent flexibility and improved brittleness as having suitable hardness. Further, they have excellent adhesiveness, high tensile strain at break value and high retention rate, and also excellent strength and excellent moist-heat durability. Among them, the copolymerized polyester resins obtained from Examples 1-1 to 1-8 indicated excellent molding property when a molded article is produced by hot-melt molding or potting. Further, the obtained molded article indicated sufficient insulating properties immediately after the molding and also after the wet heating treatment. Specifically, the molded article obtained by any of the two methods exhibited good adhesiveness between the resin and components and it can be used for a long period of time even under a severe environmental condition.

On the other hand, the copolymerized polyester resin obtained from Comparative Example 1-1 has low content of the dimer acid among the acid components. As a result, both Shore D hardness and Young's modulus are high, thus indicating poor flexibility and poor adhesiveness. Further, as having low tensile strain retention rate, moist-heat durability was low. As a result, the molded article obtained after the moist heat treatment had no insulating properties.

The copolymerized polyester resin obtained from Comparative Example 1-2 has high content of the dimer acid in the acid components while low content of the aromatic dicarboxylic acid. As a result, it was impossible to measure the melting point (that is, becomes non-crystalline), and both the heat resistance and molding property were poor. The tensile strength was also poor.

The copolymerized polyester resin obtained from Comparative Example 1-3 contains 1,6-hexane diol as a main component instead of having 1,4-butane diol as a diol component. As a result, the melting point was low, and therefore both the heat resistance and molding property were poor.

The copolymerized polyester resin obtained from Comparative Example 1-4 contains no polybutadiene glycol as a glycol component and the copolymerized polyester resin obtained from Comparative Example 1-5 contains low content of polybutadiene glycol as a glycol component. As a result, both Shore D hardness and Young's modulus are high, thus indicating poor flexibility and poor adhesiveness. Further, as having low tensile strain retention rate, moist-heat durability was low. As a result, the molded article obtained after the moist heat treatment had no insulating properties.

The copolymerized polyester resin obtained from Comparative Example 1-6 contains excessive content of polybutadiene glycol as a glycol component. As a result, the melting point was low, and therefore both the heat resistance and molding property were poor. The tensile strength was also poor.

Example 2-1

As an organo phosphorus compound, the organo phosphorus compound represented by the aforementioned structural formula (a) was used. First, as an acid component, 58 parts by mass of terephthalic acid, 7 parts by mass of isophthalic acid, and 73 parts by mass of hydrogenated dimer acid having 36 carbon atoms (Pripol 2009 manufactured by Croda Japan K.K.), and as a diol component, 60 parts by mass of 1,4-butane diol and 57 parts by mass of polybutadiene glycol (hydroxylated and hydrogenated polybutadiene mainly having 1,2-repeating unit; "GI-1000" manufactured by Nippon Soda Co., Ltd.), and also 9 parts by mass of the organo phosphorus compound (a) were used for carrying out an esterification reaction by heating at 240° C. Next, 0.1 parts by mass of tetra-n-butyl titanate were added as a catalyst and high vacuum of 0.4 hPa was finally achieved by gradually increasing the vacuum level for 60 min at a temperature of 240° C. Thereafter, the polycondensation reaction was performed for 4 hours to obtain the copolymerized polyester resin having the composition indicated in Table 2.

Examples 2-2 to 2-9 and Comparative Examples 2-1 to 2-2 and 2-4 to 2-8

The copolymerized polyester based resin composition was obtained in the same manner as Example 2-1 except that type and addition amount of terephthalic acid, isophthalic acid, hydrogenated dimer acid, 1,4-butane diol, polybutadiene glycol, and organo phosphorus compound are modified and the composition (content) is adjusted to those indicated in Table 2.

Example 2-10

The copolymerized polyester resin composition was obtained in the same manner as Example 2-1 except that 1,4-butane diol and 1,6-hexane diol are used as a glycol component and the composition (content) is adjusted to those indicated in Table 2.

Comparative Example 2-3

The copolymerized polyester resin composition was obtained in the same manner as Example 2-1 except that only 1,6-hexane diol is used as a glycol component and the composition (content) is adjusted to those indicated in Table 2.

Comparative Example 2-9

The copolymerized polyester resin composition was obtained in the same manner as Example 2-1 except that the organo phosphorus compound represented by the following structural formula (x) is used as an organo phosphorus compound.

[C3]

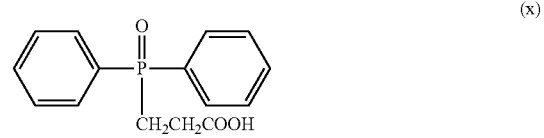

(x)

Composition, characteristic values, and evaluation results of the copolymerized polyester resin compositions obtained from Examples 2-1 to 2-10 and Comparative Examples 2-1 to 2-9 are given in Table 2.

TABLE 2

| | Composition | | | | | | | | | |
|---|---|---|---|---|---|---|---|---|---|---|
| | Acid component mol % | | | | | Glycol component mo % | | | Content of phosphorus | |
| | | | | hydrogenated | Phosphorus compound | | | | atome ppm by | Melting point |
| | TPA | TPA | DA | DA | Type | | BD | HD | PB | mass | ° C. |
| Ex. 2-1 | 64 | 8 | | 23 | (a) | 5 | 93 | | 7 | 3680 | 141 |
| Ex. 2-2 | 64 | 3 | | 23 | (a) | 5 | 97 | | 3 | 4250 | 148 |
| Ex. 2-3 | 62 | | | 33 | (a) | 5 | 93 | | 7 | 3350 | 140 |
| Ex. 2-4 | 72 | 8 | | 36 | (a) | 6 | 95 | | 5 | 4300 | 160 |
| Ex. 2-5 | 64 | 8 | 23 | | (a) | 5 | 93 | | 7 | 3650 | 142 |
| Ex. 2-6 | 64 | 8 | | 23 | (a) | 9 | 85 | | 15 | 2900 | 125 |
| Ex. 2-7 | 67 | 9 | | 23 | (a) | 1 | 93 | | 7 | 750 | 146 |
| Ex. 2-8 | 50 | 5 | | 20 | (a) | 25 | 93 | | 7 | 17670 | 125 |
| Ex. 2-9 | 64 | 8 | | 23 | (b) | 9 | 93 | | 7 | 3890 | 140 |
| Ex. 2-10 | 64 | 8 | | 23 | (a) | 6 | 78 | 15 | 7 | 3640 | 112 |
| Com. Ex. 2-1 | 78 | 8 | | 9 | (a) | 5 | 93 | | 7 | 4270 | 180 |
| Com. Ex. 2-2 | 40 | | | 55 | (a) | 5 | 93 | | 7 | 2800 | IM |
| Com. Ex. 2-3 | 64 | 8 | | 23 | (a) | 5 | | 93 | 7 | 3470 | 75 |
| Com. Ex. 2-4 | 62 | | | 33 | (a) | 5 | 100 | | 8 | 4250 | 150 |
| Com. Ex. 2-5 | 64 | 8 | | 23 | (a) | 9 | 99.7 | | 0.3 | 4640 | 139 |
| Com. Ex. 2-6 | 64 | 8 | | 23 | (a) | 9 | 75 | | 25 | 2300 | 105 |
| Com. Ex. 2-7 | 67 | 10 | | 23 | — | — | 93 | | 7 | 0 | 148 |
| Com. Ex. 2-8 | 34 | 5 | | 23 | (a) | 39 | 93 | | 7 | 23710 | IM |
| Com. Ex. 2-9 | 64 | 8 | | 23 | (x) | 5 | 93 | | 7 | 3810 | IM |

| | | | | | Moist-heat durability | | | |
|---|---|---|---|---|---|---|---|---|
| | Melt viscosity Pa·s | Young's modulus MPa | Shore D hardness | Tensile strength MPa | Tensile breaking before treatment % | Tensile breaking after treatment % | Distortion retention rate % | Adhesiveness |
| Ex. 2-1 | 45 | 26 | 38 | 9 | 772 | 687 | 89 | ○ |
| Ex. 2-2 | 50 | 44 | 47 | 10 | 706 | 599 | 86 | ○ |
| Ex. 2-3 | 43 | 23 | 34 | 8 | 811 | 738 | 91 | ○ |
| Ex. 2-4 | 60 | 58 | 47 | 12 | 710 | 596 | 84 | ○ |
| Ex. 2-5 | 44 | 46 | 46 | 9 | 773 | 588 | 89 | ○ |
| Ex. 2-6 | 40 | 20 | 31 | 8 | 822 | 756 | 92 | ○ |
| Ex. 2-7 | 48 | 45 | 46 | 9 | 780 | 694 | 89 | ○ |
| Ex. 2-8 | 41 | 29 | 37 | 9 | 765 | 673 | 88 | ○ |
| Ex. 2-9 | 45 | 28 | 37 | 9 | 774 | 689 | 89 | ○ |
| Ex. 2-10 | 41 | 27 | 36 | 10 | 726 | 645 | 89 | ○ |
| Com. Ex. 2-1 | 96 | 131 | 58 | 16 | 711 | 505 | 71 | X |
| Com. Ex. 2-2 | 40 | 10 | 33 | 3 | 837 | 795 | 95 | ○ |
| Com. Ex. 2-3 | 40 | 26 | 36 | 11 | 620 | 546 | 88 | ○ |
| Com. Ex. 2-4 | 50 | 126 | 56 | 15 | 608 | 413 | 68 | X |
| Com. Ex. 2-5 | 44 | 112 | 55 | 14 | 621 | 435 | 70 | X |
| Com. Ex. 2-6 | 41 | 9 | 32 | 4 | 803 | 763 | 95 | ○ |
| Com. Ex. 2-7 | 48 | 23 | 34 | 9 | 780 | 694 | 89 | ○ |
| Com. Ex. 2-8 | 40 | 32 | 40 | 8 | 765 | 672 | 89 | ○ |
| Com. Ex. 2-9 | IM | IM | IM | IM | IM | IM | IM | IM |

TABLE 2-continued

| | Molding property 1 | | | Molding property 2 | | | |
|---|---|---|---|---|---|---|---|
| | Molding property | Insulating properties before treatment | Insulating properties after treatment | Molding property | Insulating properties before treatment | Insulating properties after treatment | Flame retardancy OI |
| Ex. 2-1 | ○ | ○ | ○ | ○ | ○ | ○ | 31 |
| Ex. 2-2 | ○ | ○ | ○ | ○ | ○ | ○ | 31 |
| Ex. 2-3 | ○ | ○ | ○ | ○ | ○ | ○ | 31 |
| Ex. 2-4 | ○ | ○ | ○ | ○ | ○ | ○ | 31 |
| Ex. 2-5 | ○ | ○ | ○ | ○ | ○ | ○ | 31 |
| Ex. 2-6 | ○ | ○ | ○ | ○ | ○ | ○ | 30 |
| Ex. 2-7 | ○ | ○ | ○ | ○ | ○ | ○ | 28 |
| Ex. 2-8 | ○ | ○ | ○ | ○ | ○ | ○ | 37 |
| Ex. 2-9 | ○ | ○ | ○ | ○ | ○ | ○ | 30 |
| Ex. 2-10 | Δ | | | Δ | | | 31 |
| Com. Ex. 2-1 | ○ | ○ | X | ○ | ○ | X | 31 |
| Com. Ex. 2-2 | X | | | X | | | 31 |
| Com. Ex. 2-3 | X | | | X | | | 31 |
| Com. Ex. 2-4 | ○ | ○ | X | ○ | ○ | X | 31 |
| Com. Ex. 2-5 | ○ | ○ | X | ○ | ○ | X | 31 |
| Com. Ex. 2-6 | X | | | X | | | 31 |
| Com. Ex. 2-7 | ○ | ○ | ○ | ○ | ○ | ○ | 25 |
| Com. Ex. 2-8 | X | | | X | | | 40 |
| Com. Ex. 2-9 | IM | | | IM | | | IM |

IM: Impossible to masure
TPA: terephthalic acid,
DA: dimer acid,
Hydrogenated DA: hydrogenated dimer acid,
BD: 1,4-butane diol,
HD: 1,6-hexane diol,
PB: 1,2-polybutadiene glycol As clearly indicated in Table 2, the copolymerized polyester based resin composition obtained from Examples 2-1 to 2-10 have a composition which meets the requirements of the invention, and they exhibit excellent flexibility and improved brittleness as having suitable hardness. Further, they have excellent adhesiveness, high tensile strain at break value and high retention rate, and also excellent strength and excellent moist-heat durability. In addition, the OI value was 28 or higher, indicating sufficient flame retardancy. Among them, the copolymerized polyester based resin composition obtained from Examples 2-1 to 2-9 indicated excellent molding property when a molded article is produced by hot-melt molding or potting. Further, the obtained molded article indicated sufficient insulating properties immediately after the molding and also after the wet heating treatment. Specifically, the molded article obtained by any of the two methods exhibit good adhesiveness between the resin and components and it can be used for a long period of time even under a severe environmental condition.

Meanwhile, the copolymerized polyester based resin composition obtained from Comparative Example 2-1 has low content of the dimer acid among the acid components. As a result, both Shore D hardness and Young's modulus are high, thus indicating poor flexibility and poor adhesiveness. Further, as having low tensile strain retention rate, moist-heat durability was low. As a result, the molded article obtained after the moist heat treatment had no insulating properties.

The copolymerized polyester based resin composition obtained from Comparative Example 2-2 has high content of the dimer acid among the acid components while low content of the aromatic dicarboxylic acid. As a result, it was impossible to measure the melting point, and both the heat resistance and molding property were poor. The tensile strength was also poor.

The copolymerized polyester based resin composition obtained from Comparative Example 2-3 contains 1,6-hexane diol as a main component instead of having 1,4-butane diol as a diol component. As a result, the melting point was low, and therefore both the heat resistance and molding property were poor.

The copolymerized polyester based resin composition obtained from Comparative Example 2-4 contains no polybutadiene glycol as a glycol component and the copolymerized polyester based resin composition obtained from Comparative Example 2-5 contains low content of polybutadiene glycol as a glycol component. As a result, both Shore D hardness and Young's modulus are high, thus indicating poor flexibility and poor adhesiveness. Further, as having low tensile strain retention rate, moist-heat durability was low. As a result, the molded article obtained after the moist heat treatment had no insulating properties.

The copolymerized polyester based resin composition obtained from Comparative Example 2-6 contains excessive content of polybutadiene glycol as a glycol component. As a result, the melting point was low, and therefore both the heat resistance and molding property were poor. The tensile strength was also poor.

The copolymerized polyester based resin composition obtained from Comparative Example 2-7 contains no organo phosphorus compound. As a result, the OI value was low, indicating insufficient flame retardancy.

The copolymerized polyester based resin composition obtained from Comparative Example 2-8 contains excessive content of organo phosphorus compound. As a result, the composition was amorphous (it was impossible to measure the melting point), and both the heat resistance and molding property were insufficient.

The copolymerized polyester based resin composition obtained from Comparative Example 2-9 contains only the organo phosphorus compound having one ester forming functional group, and therefore the polycondensation reaction was inhibited, yielding no increase in polymerization degree. As a result, the polymerization degree was exceedingly low, making it impossible to perform various evaluations.

Example 3-1

The copolymerized polyester resin prepared in Example 1-1 and, as a thermally conductive filling agent, talc [K-1 manufactured by Nippon Talc Co., Ltd., average particle diameter: 8 μm, thermal conductivity: 10 W/(m·K), density: 2.7 g/cm$^3$] were used. To a main hopper of a two-screw extruder (TEM26SS manufactured by TOSHIBA MACHINE CO., LTD., screw diameter 26 mm), 100 parts by volume of the copolymerized polyester resin and 80 parts by volume of the thermally conductive filling agent were supplied and then melt-kneaded at a temperature of 200° C. Subsequently, the mixture was extruded into strands, solidified by cooling, and cut to give pellets, yielding the copolymerized polyester based resin composition.

Example 3-2

The copolymerized polyester based resin composition was produced in the same manner as Example 3-1 except that aluminum oxide [manufactured by DENKI KAGAKU KOGYO KABUSHIKI KAISHA, average particle diameter: 10 m, thermal conductivity: 38 W/(m·K), density: 3.97 g/cm$^3$] is used as a thermally conductive filling agent.

Example 3-3

The copolymerized polyester based resin composition was obtained in the same manner as Example 3-1 except that magnesium carbonate [manufactured by Konoshima Chemical Co., Ltd., average particle diameter: 10 μm, thermal conductivity: W/(m·K), density: 3.05 g/cm$^3$] is used as a thermally conductive filling agent.

Example 3-4

The copolymerized polyester based resin composition was obtained in the same manner as Example 3-1 except that the copolymerized polyester resin prepared in Example 1-3 is used.

Example 3-5

The copolymerized polyester based resin composition was prepared in the same manner as Example 3-2 except that the copolymerized polyester resin obtained from Example 1-3 is used.

Composition, characteristic values, and evaluation results of the copolymerized polyester based resin compositions obtained from Examples 3-1 to 3-5 are shown in Table 3. As the copolymerized polyester based resin compositions obtained from Examples 3-1 to 3-5 contain a large amount of the thermally conductive filling agent and have high melt viscosity, it is difficult to use them for potting application. Accordingly, evaluation of the molding property 2 was not performed.

TABLE 3

| | | Composition of resin | | | | | | | |
|---|---|---|---|---|---|---|---|---|---|
| | | Copolymerized polyester resin | | Thermally conductive filling agent | | | | | |
| | | Type | Parts by volume | Type | Parts by volume | Melting point ° C. | Melt viscosity Pa · s | Young's modulus MPa | Shore D hardness | Tensile strength MPa |
| Example | 3-1 | Example 1-1 | 100 | TC | 80 | 150 | 240 | 90 | 48 | 8 |
| | 3-2 | Example 1-1 | 100 | ALO | 80 | 150 | 170 | 80 | 46 | 8 |
| | 3-3 | Example 1-1 | 100 | NgCO | 80 | 150 | 230 | 90 | 49 | 7 |
| | 3-4 | Example 1-3 | 100 | TC | 80 | 155 | 240 | 90 | 46 | 6 |
| | 3-5 | Example 1-3 | 100 | ALO | 80 | 155 | 180 | 80 | 45 | 7 |

TABLE 3-continued

|  |  | Moist-heat durability | | | | Molding property 1 | | | |
|---|---|---|---|---|---|---|---|---|---|
|  |  | Tensile strain at break before treatment % | Tensile strain at break after treatment % | Tensile strain retention rate % | Adhesiveness | Molding property | Insulating properties before treatment | Insulating properties after treatment | Thermal conductivity W/mk |
| Example | 3-1 | 20 | 18 | 90 | Δ | ○ | ○ | ○ | 1.1 |
|  | 3-2 | 28 | 26 | 93 | Δ | ○ | ○ | ○ | 1.8 |
|  | 3-3 | 19 | 17 | 89 | Δ | ○ | ○ | ○ | 1.5 |
|  | 3-4 | 22 | 19 | 86 | Δ | ○ | ○ | ○ | 1.2 |
|  | 3-5 | 28 | 26 | 93 | Δ | ○ | ○ | ○ | 1.8 |

As clearly indicated in Table 3, the copolymerized polyester based resin compositions obtained in Examples 3-1 to 3-5 have a composition satisfying the conditions of the invention in which a thermally conductive filling agent is contained in the copolymerized polyester resin. Thus, they are given with thermal conductivity while still having the advantages of the copolymerized polyester resin obtained in Example 1-1 or Example 1-3. For such reasons, in various electronic components or the like, they can be desirably used for an application in which measures for dealing with heat, for example, efficiently releasing the heat generated from various electronic components or the like to an external environment, are required.

In addition, the thermal conductivity of the copolymerized polyester resin obtained from Example 1-1 (containing no thermally conductive filling agent) was found to be 0.1 W/mk.

Example 4-1

The copolymerized polyester resin prepared in Example 1-1 and, as a flame retardant agent, an aromatic condensed phosphate ester compound [PX-200 manufactured by DAIHACHI CHEMICAL INDUSTRY CO., LTD.] were used. To a two-screw extruder (TEX30C manufactured by The Japan Steel Works, LTD., screw diameter 30 mm), 100 parts by mass of the copolymerized polyester resin and 20 parts by mass of the flame retardant agent were supplied and then melt-kneaded at the setting temperature of 255° C. and screw revolution number of 200 rpm. Subsequently, the mixture was extruded into strands, solidified by cooling, and cut to give pellets, yielding the copolymerized polyester based resin composition.

Examples 4-2 to 4-5

The copolymerized polyester based resin composition was obtained in the same manner as Example 4-1 except that type of the copolymerized polyester resin and addition amount of the flame retardant agent are modified to those described in Table 4.

Example 4-6

The copolymerized polyester based resin composition was obtained in the same manner as Example 4-1 except that 20 parts by mass of brominated epoxy resin and 10 parts by mass of antimony trioxide are used as a flame retardant agent.

Examples 4-7 to 4-10

The copolymerized polyester based resin composition was obtained in the same manner as Example 4-6 except that type of the copolymerized polyester resin and addition amount of the flame retardant agent are modified to those described in Table 4.

Composition, characteristic values, and evaluation results of the copolymerized polyester based resin composition obtained from Examples 4-1 to 4-10 are given in Table 4.

TABLE 4

|  |  | Composition of resin | | | | | | | | | | Moist-heat durability |
|---|---|---|---|---|---|---|---|---|---|---|---|---|
|  |  | Co-polymerized polyester resin | | Flame retardant agent | | | | | | | | |
|  |  | Type | Parts by mass | Type | Parts by mass | Type | Parts by mass | Melting point ° C. | Melt viscosity Pa·s | Young's modulus MPa | Shore D hardness | Tensile strength MPa | Tensile strain at break before treatment % |
| Example | 4-1 | Ex. 1-1 | 100 | A | 20 |  |  | 150 | 55 | 31 | 38 | 8 | 806 |
|  | 4-2 | Ex. 1-1 | 100 | A | 25 |  |  | 150 | 62 | 35 | 40 | 7 | 801 |
|  | 4-3 | Ex. 1-2 | 100 | A | 20 |  |  | 156 | 66 | 50 | 43 | 9 | 758 |
|  | 4-4 | Ex. 1-3 | 100 | A | 20 |  |  | 155 | 53 | 23 | 34 | 7 | 853 |
|  | 4-5 | Ex. 1-4 | 100 | A | 20 |  |  | 170 | 76 | 42 | 44 | 8 | 827 |
|  | 4-6 | Ex. 1-1 | 100 | B | 20 | C | 10 | 150 | 75 | 32 | 37 | 8 | 801 |
|  | 4-7 | Ex. 1-1 | 100 | B | 25 | C | 10 | 150 | 80 | 38 | 43 | 7 | 803 |

TABLE 4-continued

| | | | | | | | | | | | | |
|---|---|---|---|---|---|---|---|---|---|---|---|---|
| 4-8 | Ex. 1-2 | 100 | B | 20 | C | 10 | 156 | 82 | 53 | 45 | 9 | 760 |
| 4-9 | Ex. 1-3 | 100 | B | 20 | C | 10 | 155 | 75 | 27 | 34 | 7 | 852 |
| 4-10 | Ex. 1-4 | 100 | B | 20 | C | 10 | 170 | 83 | 44 | 45 | 8 | 821 |

| | | Moist-heat durability | | | Molding property 1 | | | Molding property 2 | | | |
|---|---|---|---|---|---|---|---|---|---|---|---|
| | | Tensile strain at break after treatment % | Tensile strain retention rate % | Adhesiveness | Molding property | Insulating properties before treatment | Insulating properties after treatment | Molding property | Insulating properties before treatment | Insulating properties after treatment | Flame retardancy OI |
| Example | 4-1 | 725 | 90 | ○ | ○ | ○ | ○ | ○ | ○ | ○ | 31 |
| | 4-2 | 713 | 89 | ○ | ○ | ○ | ○ | ○ | ○ | ○ | 38 |
| | 4-3 | 715 | 95 | ○ | ○ | ○ | ○ | ○ | ○ | ○ | 31 |
| | 4-4 | 804 | 94 | ○ | ○ | ○ | ○ | ○ | ○ | ○ | 31 |
| | 4-5 | 769 | 93 | ○ | ○ | ○ | ○ | ○ | ○ | ○ | 31 |
| | 4-6 | 713 | 89 | ○ | ○ | ○ | ○ | ○ | ○ | ○ | 31 |
| | 4-7 | 715 | 89 | ○ | ○ | ○ | ○ | ○ | ○ | ○ | 37 |
| | 4-8 | 714 | 94 | ○ | ○ | ○ | ○ | ○ | ○ | ○ | 31 |
| | 4-9 | 801 | 94 | ○ | ○ | ○ | ○ | ○ | ○ | ○ | 31 |
| | 4-10 | 764 | 93 | ○ | ○ | ○ | ○ | ○ | ○ | ○ | 31 |

Flame retardant agent
A: aromatic condensed phosphate ester compound
B: brominated epoxy resin
C: antimony trioxide As clearly indicated in Table 4, the copolymerized polyester based resin compositions obtained from Examples 4-1 to 4-10 have a composition satisfying the conditions of the invention in which an aromatic condensed phosphate ester compound, a brominated aromatic compound, or antimony oxide is contained as a flame retardant agent. Thus, they are given with flame retardancy while still having the advantages of the copolymerized polyester resin obtained from Examples 1-1 to 1-4. For such reasons, they can be desirably used for an application in various electronic components in which flame retardancy is required.

The invention claimed is:

1. A resin composition comprising a copolymerized polyester resin which contains, as an acid component, an aromatic dicarboxylic acid and a dimer acid and, as a glycol component 1,4-butane diol and polybutadiene glycol, with the content of the dimer acid being 10 to 50 mol % in the acid component, the content of the 1,4-butane diol being 80 to 98 mol % in the glycol component, and the content of the polybutadiene glycol being 2 to 20 mol % in the glycol component.

2. The resin composition according to claim 1, wherein an organic phosphorus compound having two or more ester forming functional groups is copolymerized in the copolymerized polyester resin and the content of phosphorus atoms in the resin is between 500 and 20000 ppm by mass.

3. The resin composition according to claim 1, wherein Young's modulus at 20° C. is 100 MPa or less.

4. The resin composition according to claim 1, wherein Shore D hardness at 20° C. is 50 or less.

5. The resin composition according to claim 1, wherein an oxygen index according to a combustion test is 27 or more.

6. A method for producing a resin molded article, the method comprising a step of molding the resin composition according to claim 1 at a pressure of 5 MPa or less to obtain the resin molded article.

7. The method according to claim 6, wherein the step is carried out by injecting the resin composition according to claim 1 into a mold, in which an industrial component is disposed in advance to obtain the resin molded article having the industrial component.

8. The method according to claim 6, wherein the step is carried out by injecting or adding dropwise the resin composition according to claim 1 to a housing or a substrate in which an industrial component is disposed in advance to obtain resin molded article having the industrial component.

9. The resin composition according to claim 1, wherein a melting point of the copolymerized polyester resin is from 115 to 180° C.

* * * * *